United States Patent
Fujita et al.

(10) Patent No.: US 10,677,356 B2
(45) Date of Patent: Jun. 9, 2020

(54) SEALING STRUCTURE FOR AIRTIGHT CONTAINER AND VEHICLE REFRIGERANT COMPRESSOR PROVIDED WITH SAID STRUCTURE

(71) Applicant: MITSUBISHI HEAVY INDUSTRIES THERMAL SYSTEMS, LTD., Tokyo (JP)

(72) Inventors: Katsuhiro Fujita, Tokyo (JP); Masahiro Kato, Tokyo (JP); Tomohisa Moro, Tokyo (JP); Hideki Suetake, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 15/764,401

(22) PCT Filed: Aug. 4, 2016

(86) PCT No.: PCT/JP2016/072983
§ 371 (c)(1),
(2) Date: Mar. 29, 2018

(87) PCT Pub. No.: WO2017/056713
PCT Pub. Date: Apr. 6, 2017

(65) Prior Publication Data
US 2018/0292008 A1 Oct. 11, 2018

(30) Foreign Application Priority Data
Oct. 2, 2015 (JP) .................................. 2015-197039

(51) Int. Cl.
*F16J 15/00* (2006.01)
*F16J 15/10* (2006.01)
(Continued)

(52) U.S. Cl.
CPC ............. *F16J 15/10* (2013.01); *F01C 19/005* (2013.01); *F04B 39/00* (2013.01); *F04B 39/12* (2013.01);
(Continued)

(58) Field of Classification Search
CPC .. F16J 15/06; F16J 15/10; F16J 15/102; F16J 15/104; F16J 15/106; F01C 19/005;
(Continued)

(56) References Cited

U.S. PATENT DOCUMENTS 5,000,463 A * 3/1991 Sun ........................ F16J 15/008
277/500
6,322,086 B1 11/2001 Yokomachi et al.
(Continued)

FOREIGN PATENT DOCUMENTS

JP 2-9373 U 1/1990
JP 9-42156 A 2/1997
(Continued)

OTHER PUBLICATIONS

International Search Report and Written Opinion of the International Searching Authority (Forms PCT/ISA/210 and PCT/ISA/237), dated Sep. 6, 2016, for International Application No. PCT/JP2016/072983, with English translations.

*Primary Examiner* — Gilbert Y Lee
(74) *Attorney, Agent, or Firm* — Birch, Stewart, Kolasch & Birch, LLP (57) ABSTRACT

An object of the present invention is to achieve favorable sealability by a simple and low-cost structure using an O-ring. A sealing structure according to the present invention is provided with: a first sealing surface formed in an annular shape on a first container structural member configuring a housing (container); a second sealing surface overlaid on the first sealing surface, formed in annular shape
(Continued)

on a second container structural member configuring the housing; a plurality of concentric O-ring grooves formed on at least one of the first sealing surface and second sealing surface; and a plurality of O-rings fitted into the plurality of O-ring grooves. The filling ratio of the O-ring in the O-ring groove positioned on an outer side of the housing is larger than the filling ratio of the O-ring in the O-ring groove positioned on an inner side of the housing.

5 Claims, 7 Drawing Sheets

(51) Int. Cl.
  *F04C 18/02*  (2006.01)
  *F04B 39/00*  (2006.01)
  *F04B 39/12*  (2006.01)
  *F04C 27/00*  (2006.01)
  *F01C 19/00*  (2006.01)
  *F04C 23/00*  (2006.01)

(52) U.S. Cl.
  CPC ........ *F04C 18/0215* (2013.01); *F04C 23/008* (2013.01); *F04C 27/008* (2013.01); *F04C 2210/26* (2013.01); *F04C 2240/30* (2013.01)

(58) Field of Classification Search
  CPC ...... F04B 39/00; F04B 39/12; F04C 18/0215; F04C 23/008; F04C 27/008; F04C 2210/26; F04C 2240/30
  See application file for complete search history.

(56) References Cited

U.S. PATENT DOCUMENTS

| | | | |
|---|---|---|---|
| 6,443,502 B1 * | 9/2002 | Iida | B60H 1/00571 |
| | | | 277/650 |
| 6,722,666 B2 * | 4/2004 | Yokomachi | F16J 15/002 |
| | | | 277/638 |
| 2016/0076800 A1 * | 3/2016 | Sishtla | F16J 15/002 |
| | | | 285/363 |

FOREIGN PATENT DOCUMENTS

| | | |
|---|---|---|
| JP | 2000-170656 A | 6/2000 |
| JP | 2005-133951 A | 5/2005 |
| JP | 2007-332919 A | 12/2007 |
| JP | 2008-281134 A | 11/2008 |
| JP | 2014-81073 A | 5/2014 |

* cited by examiner

SEALING STRUCTURE FOR AIRTIGHT CONTAINER AND VEHICLE REFRIGERANT COMPRESSOR PROVIDED WITH SAID STRUCTURE

TECHNICAL FIELD

The present invention relates to a sealing structure for an airtight container sealed in a liquid tight manner by interposing a plurality of O-rings on a housing sealing surface of a vehicle refrigerant compressor, flange sealing surface of an airtight container, or the like, and relates to a refrigerant compressor provided with the sealing structure.

BACKGROUND ART

Patent Document 1 discloses a sealing structure where double O-rings are provided on an inside and outside of a housing sealing surface of a vehicle refrigerant compressor such that corrosive components such as moisture, salt, or the like are suppressed from penetrating between sealing surfaces to prevent generation of corrosion in the sealing surfaces.

Patent Document 2 discloses a sealing structure where an O-ring and circular packing material are doubly provided inside and outside on a flange sealing surface of a sealed container sealing electric power equipment, and penetration of rainwater or the like is prevented by a circular packing material on an outer circumferential side such that air tightness is maintained by the O-ring on an inner circumferential side.

In general, in a case where a housing sealing surface, flange sealing surface, or the like is sealed using an O-ring, the filling ratio of the O-ring inside an O-ring groove formed on the sealing surface, in other words, the ratio of the O-ring volume (cross-sectional area) with regard to the internal volume (cross-sectional area) of the O-ring groove is estimated to have a median value of a set reference range of approximately 75%, and a maximum value of 90% or less.

CITATION LIST

Patent Document

Patent Document 1: JP 09-42156 A
Patent Document 2: JP 02-9373 Y

SUMMARY OF INVENTION

Technical Problems

In a vehicle refrigerant compressor, corrosive components such as rainwater, salt water where a snow melting agent dispersed on a road is dissolved, or the like comes into contact with the housing and penetrates deep into the housing sealing surface, and therefore, installing double O-rings inside and outside the sealing surface is effective.

However, the filling ratio median value of the O-rings on an inner circumferential side and outer circumferential side is approximately 75% as described above in the present condition, and therefore, corrosive components may penetrate through the O-ring on the outer circumferential side, and thus a sealing effect based on providing double O-rings is not sufficiently demonstrated.

As with the sealing structure in Patent Document 2, in a case where a circular packing material is used in place of the O-ring on the outer circumferential side, sealability that is more excellent than the O-ring can be achieved.

However, with a vehicle refrigerant compressor, the gap tolerance between a housing and a scroll compression mechanism stored inside the housing is very severe, and therefore, a circular packing material where the sealing surface gap changes based on a fastening torque of an assembly bolt is not suitable for use.

On the other hand, in a case where an O-ring is used, the sealing surfaces of the housing directly contact each other to achieve a so-called metal touch, and the size of the sealing surface gap is not influenced by the fastening torque of the assembly bolt, and therefore, unevenness is not present even in the gap between the housing and scroll compression mechanism, and thus the quality of the vehicle refrigerant compressor can be stabilized.

Furthermore, the O-ring is less expensive than the circular packing material, and assembly is also simple, and therefore, advantages are large even from the perspective of manufacturing cost. Therefore, use of an O-ring as a sealing member on a housing sealing surface of the vehicle refrigerant compressor is continued.

In view of the foregoing, an object of the present invention is to provide a sealing structure of an airtight container, which can achieve favorable sealability by a simple and low-cost structure using an O-ring, and a vehicle refrigerant compressor provided with the structure.

Solution to Problems

In order to solve the aforementioned problem, the present invention provides the following means.

In other words, a sealing structure for an airtight container according to the present invention, includes: a first sealing surface formed in an annular shape on a first container structural member configuring a container; a second sealing surface overlaid on the first sealing surface, formed in annular shape on a second container structural member configuring the container; a plurality of concentric O-ring grooves formed on at least one of the first sealing surface and second sealing surface; and a plurality of O-rings fitted into the plurality of O-ring grooves; where the filling ratio of the O-ring in the O-ring groove positioned on an outer side of the container is larger than the filling ratio of the O-ring in the O-ring groove positioned on an inner side of the container.

According to the sealing structure with the aforementioned configuration, the filling ratio (compression ratio) of the outer side O-ring is greater than the filling ratio of the inner side O-ring, and therefore, the sealability of the outer side O-ring is high. Thereby, corrosive components from the outside that were conventionally allowed to penetrate over a long period of time can be effectively inhibited by the outer side O-ring.

According to the sealing structure, favorable sealability can be achieved by a simple and low-cost structure using an O-ring and O-ring groove similar to a conventional structure, without requiring a change in component type, change in the structure, or the like.

In the sealing structure, the filling ratio of the O-ring in the O-ring groove positioned on an inner side of the container is preferably set to a target range of 70 to 75% and a maximum permissible value of 90%, and the filling ratio of the O-ring in the O-ring groove positioned on an outer side of the container is preferably set to a target range of 80 to 85% and a maximum permissible value of 98%.

Thereby, the filling ratio of the inner side O-ring is the same as conventional, and the filling ratio of the outer side O-ring is greater than the inner side O-ring. For example, in a housing for a vehicle refrigerant compressor, high pressure container, or the like where the inside of the container has high pressure, compression is applied on the inner side O-ring in accordance with filling the O-ring groove, and thus stress due to internal pressure of the container is also applied. Therefore, when the filling ratio of the inner side O-ring is higher than conventional, the durability thereof may be impaired.

Therefore, the filling ratio of the outer side O-ring where internal pressure of the container is not directly applied is higher than the filling ratio of the inner side O-ring, and thus, sealability can be improved without impairing the durability of the outer side O-ring and inner side O-ring.

In the sealing structure, the cross section of the O-ring groove positioned on an inner side of the container and the cross section of the O-ring groove positioned on an outer side of the container may have the same shape and dimensions, and a wire diameter of the O-ring positioned on an outer side of the container may be wider than a wire diameter of the O-ring positioned on an inner side of the container such that the filling ratio of the O-ring positioned on an outer side is larger than the filling ratio of the O-ring positioned on an inner side.

According to the aforementioned configuration, the filling ratio of the outer side O-ring can be increased by simply making the wire diameter of the outer side O-ring thicker than the wire diameter of the inner side O-ring, in other words, changing the outer side O-ring, without changing the O-ring groove on the container side. Therefore, favorable sealability can be achieved by a very simple and inexpensive configuration.

In the sealing structure, the wire diameter of the O-ring positioned on an inner side of the container and the wire diameter of the O-ring groove positioned on an outer side of the container may be the same, and an internal volume of the O-ring groove positioned on an outer side of the container may be smaller than an internal volume of the O-ring groove positioned on an inner side of the container such that the filling ratio of the O-ring positioned on an outer side is larger than the filling ratio of the O-ring positioned on an inner side.

According to the aforementioned configuration, the filling ratio of the outer side O-ring can be increased by making the internal volume of the outer side O-ring groove smaller than the internal volume of the inner side O-ring, without changing the inner and outer O-ring. Changing the shape of the O-ring groove can be easily performed by changing the setting of a cutting machine forming the O-ring groove. Therefore, favorable sealability can be achieved by a very simple and inexpensive configuration.

Furthermore, a vehicle refrigerant compressor according to the present invention is provided with any of the aforementioned sealing structures for an airtight container.

Therefore, corrosive components from the outside that were conventionally allowed to penetrate over a long period of time can be effectively inhibited by the outer side O-ring, based on a simple and low-cost structure using the same O-ring as conventional.

Advantageous Effects of Invention

According to the sealing structure for an airtight container according to the present invention and the vehicle refrigerant compressor provided with the structure as described above, favorable sealability can be achieved by a simple and low-cost structure using an O-ring.

DESCRIPTION OF EMBODIMENTS

Embodiments of the present invention will be described below while referring to the drawings.

Figure 1:
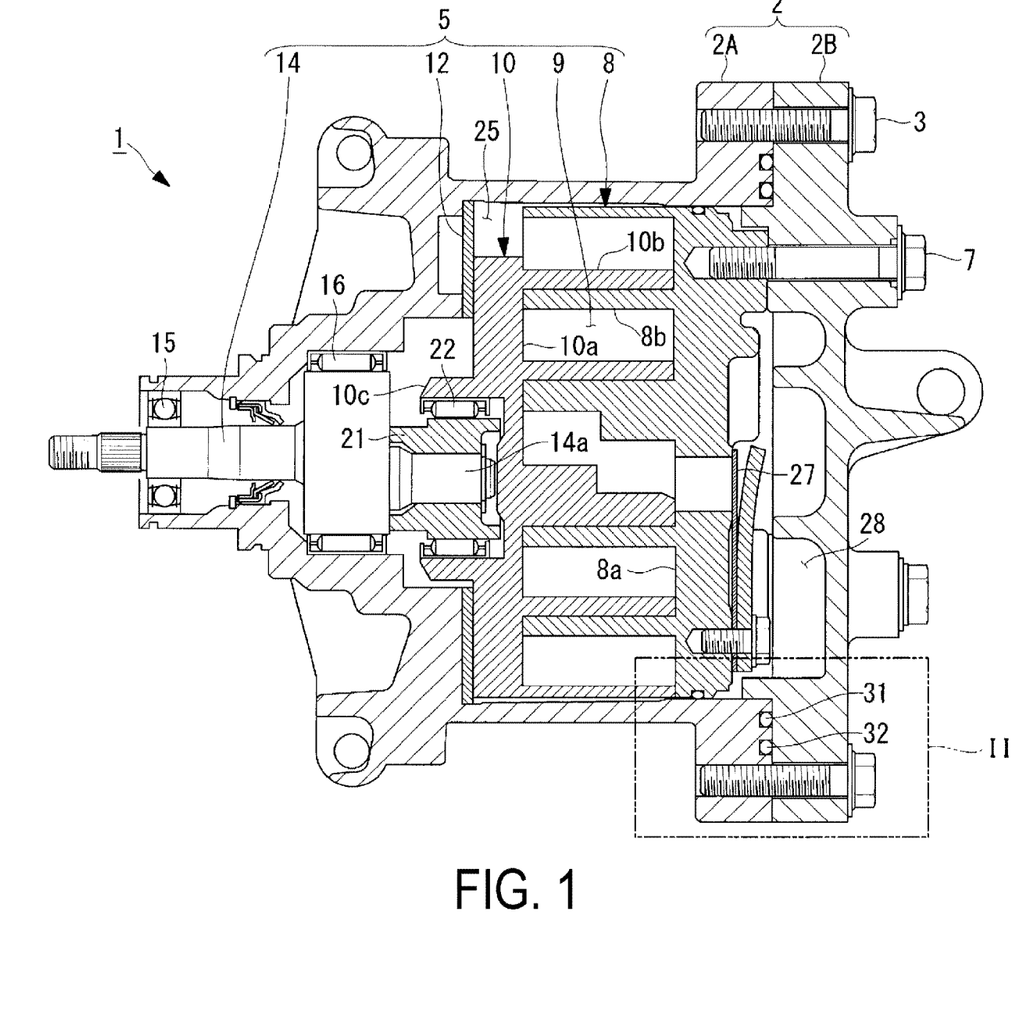
FIG. 1 is a vertical cross-sectional view illustrating an example of a vehicle refrigerant compressor provided with a sealing structure according to an embodiment of the present invention.

FIG. 1 a vertical cross-sectional view illustrating an example of a vehicle refrigerant compressor according to the present invention. A vehicle refrigerant compressor 1 is incorporated in an air conditioner of an automobile for example, and is driven by power of an engine not illustrated in the drawing, and refrigerant gas is compressed and supplied to a refrigerant circuit of the air conditioner.

The vehicle refrigerant compressor 1 is provided with a housing 2 (container) with a configuration where a rear housing 2B (second container structural member) is fastened to a front housing 2A (first container structural member) by a plurality of bolts, and a scroll compression mechanism 5 is stored inside the housing 2.

The scroll compression mechanism 5 is configured to have: a fixed scroll 8 secured by a bolt 7 or the like to the housing 2 (2B); an orbiting scroll 10 facing the fixed scroll 8, and forming a compression chamber 9 that compresses refrigerant gas; a thrust plate 12 that supports a load in a thrusting direction of the orbiting scroll 10; and a main shaft 14 that drives the orbiting scroll 10. The main shaft 14 is axially supported on a front housing 2A side by bearings 15, 16, a tip portion thereof protrudes outward, and a drive pulley not illustrated in the drawing is attached thereto.

For the fixed scroll 8 and orbiting scroll 10, spiral wraps 8b, 10b are integrally formed on one surface side of disk-shaped end plates 8a, 10a. The wraps 8b, 10b smoothly slidably contact the end plates 8a, 10a where the tip portions thereof oppose, and a pair of the compression chambers 9 are formed enclosed by the end plates 8a, 10a and wraps 8b, 10b.

An eccentric pin 14a provided on the main shaft 14 is fitted to an inner circumference of a boss 10c of the orbiting scroll 10 through a bush 21 and bearing 22, and when the main shaft 14 is rotated, the orbiting scroll 10 turns while preventing autorotation by an autorotation preventing mechanism not illustrated in the drawing. Therefore, the volume thereof is reduced while the pair of compression chambers 9 formed between the wraps 8b, 10b of the fixed scroll 8 and orbiting scroll 10 move from the outer circumferential side to the inner circumferential side, refrigerant gas suctioned from a suction port not illustrated in the drawing provided in a low pressure chamber 25 in the front housing 2A is suctioned into the compression chamber 9 and then compressed, and the refrigerant gas compressed to a high pressure is discharged from a discharge port not illustrated in the drawing provided on the rear housing 2B through a discharge valve 27 and high pressure chamber 28.

When compressing the refrigerant gas, a reaction force of the compresses refrigerant gas is applied to the end plate 8a of the fixed scroll 8 and the end plate 10a of the orbiting scroll 10, and therefore, the movable orbiting scroll 10 is pressed in a separated direction (thrust direction) in an axial direction onto the secured fixed scroll 8. The thrust load of the orbiting scroll 10 is supported by the thrust plate 12.

The double inside and outside O-rings 31, 32 are sandwiched between the front housing 2A and rear housing 2B such that the air tightness inside the housing 2 is maintained. As illustrated in an enlarged first placement example of the O-rings 31, 32 in FIG. 2, the circular sealing surface 2a (first sealing surface) is formed on the front housing 2A, and the circular sealing surface 2b (second sealing surface) is also formed on the rear housing 2B. The sealing surfaces 2a, 2b are formed in a flat surface shape orthogonal to a longitudinal axial direction of the housing 2, and closely contact (metal touch) each other. Herein, when a circular packing material (gasket) is interposed, an axial gap between the housing 2 and scroll compression mechanism 5 (8, 10) changes due to a fastening torque of the bolt 3, which is not preferred.

Figure 2:
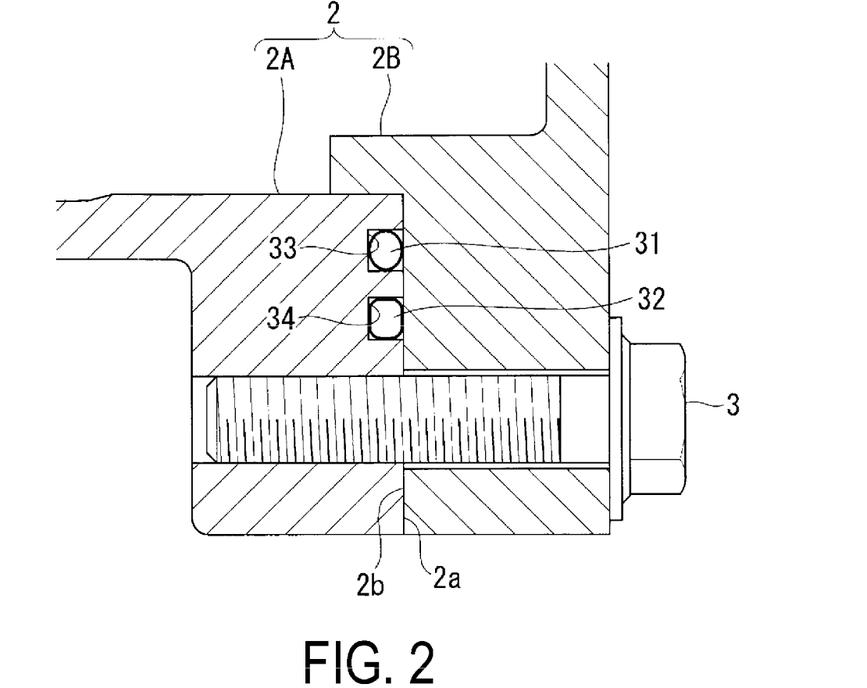
FIG. 2 is a vertical cross-sectional view illustrating a first placement example of an O-ring by enlarging part II in FIG. 1.

For example, The double inside and outside O-ring grooves 33, 34 are formed in an concentric shape on the sealing surface 2a on the front housing 2A side, and the O-ring 31 positioned on an inner side of the housing 2 and the O-ring 32 positioned on an outer side of the housing 2 are respectively fitted in the O-ring grooves 33, 34. "Inner side" as referred to herein is the closest to the inside of the housing 2, and "outer side" is the closest to the outside of the housing 2.

The O-ring grooves 33, 34 may be formed on the sealing surface 2b on the rear housing 2B side. The placement layout of the O-ring grooves 33, 34 and O-rings 31, 32 is not restricted to the first placement example illustrated in FIG. 2, and second to fourth placement examples illustrated in FIG. 3 to FIG. 5 and other placement examples may also be adopted. Examples of the material of the O-rings 31, 32 can include ethylene propylene rubber (EPDM), hydrogenated nitrile rubber (HNBR), and the like with excellent oil resistance and chemical resistance.

Figure 3:
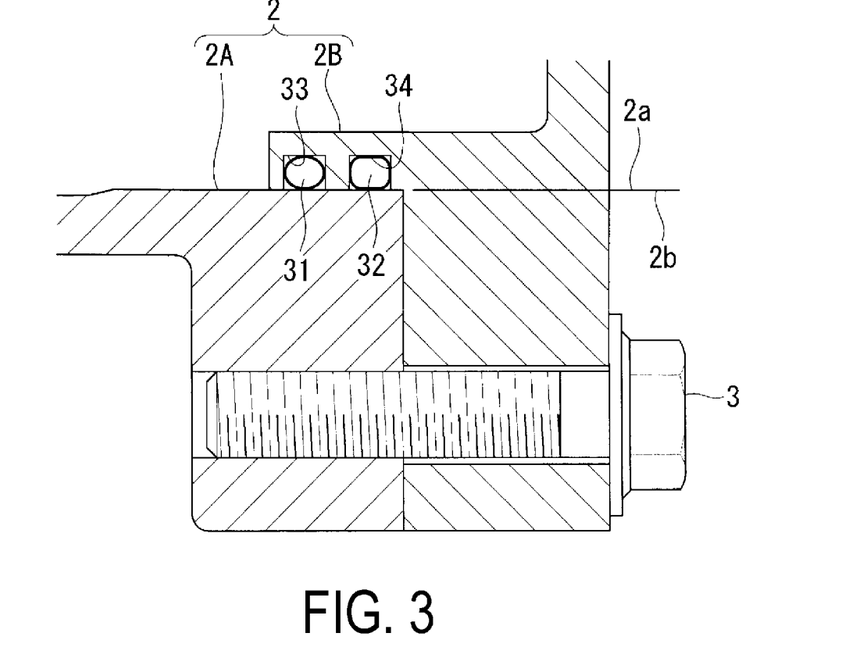
FIG. 3 is a vertical cross-sectional view illustrating a second placement example of an O-ring.

In the second placement example of the O-rings 31, 32 illustrated in FIG. 3, the sealing surface 2a of the front housing 2A and the sealing surface 2b of the rear housing 2B are formed in a cylindrical surface shape around a longitudinal axis of the housing 2, and the sealing surface 2b is tightly inserted inside the sealing surface 2a. Herein, the O-ring grooves 33, 34 are formed as an outer circumference O-ring groove on the sealing surface 2b side, but may also be formed as an inner circumference O-ring groove on the sealing surface 2a side. The diameters of the O-rings 31, 32 are the same in the second placement example.

Figure 4:
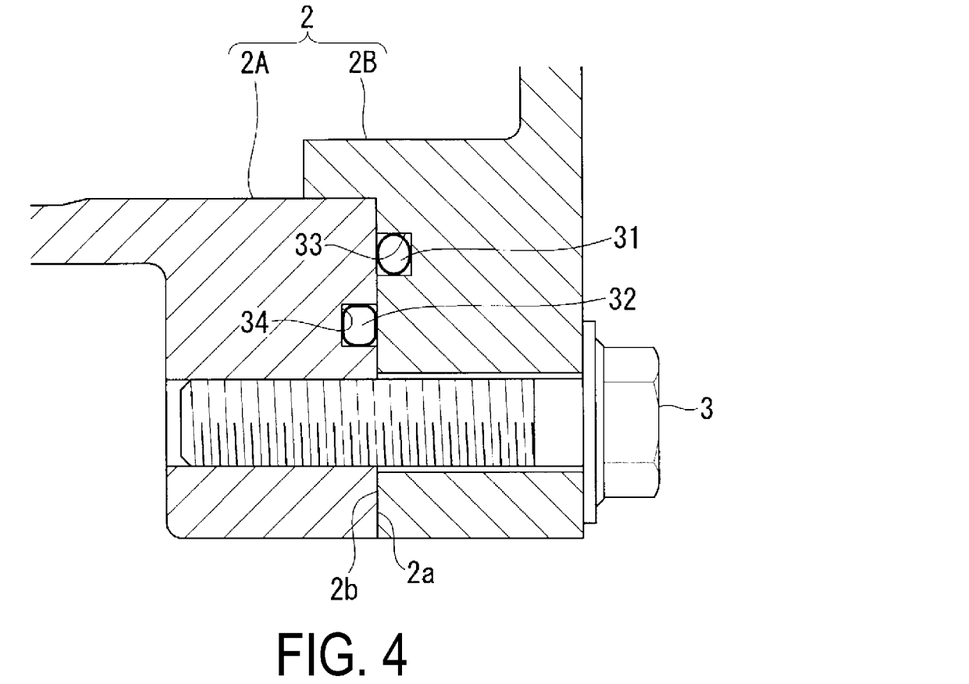
FIG. 4 is a vertical cross-sectional view illustrating a third placement example of an O-ring.

In the third placement example of the O-rings 31, 32 illustrated in FIG. 4, the sealing surfaces 2a, 2b are formed in a flat surface shape orthogonal to the longitudinal axial direction of the housing 2 similar to FIG. 2. For example, the inner side O-ring groove 33 is formed on the sealing surface 2b, the outer side O-ring groove 34 is formed on the sealing surface 2a, and the O-rings 31, 32 are respectively fitted therein.

Figure 5:
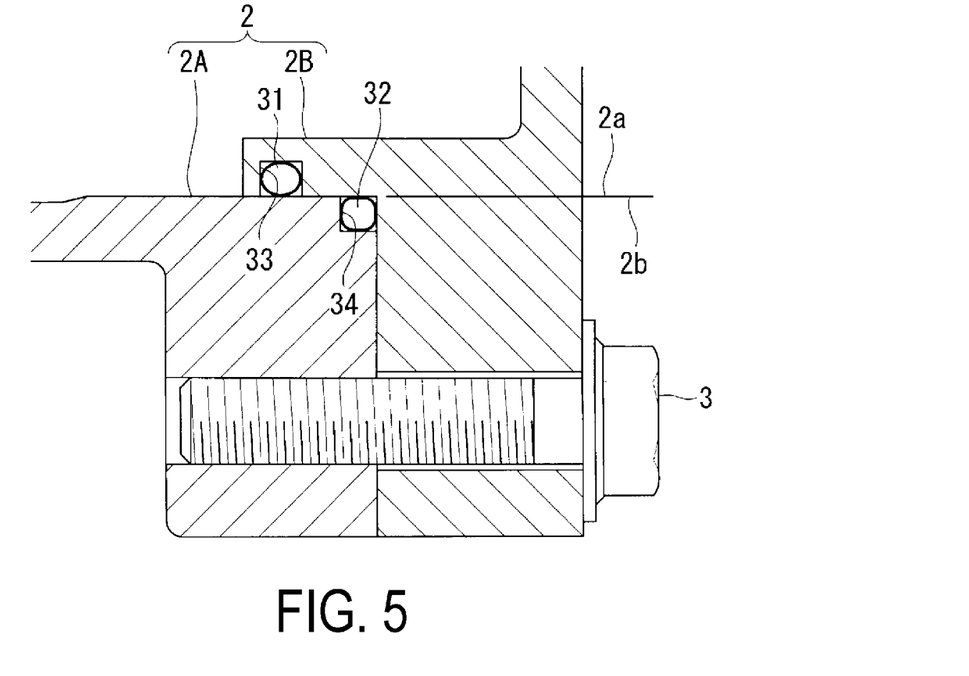
FIG. 5 is a vertical cross-sectional view illustrating a fourth placement example of an O-ring.

In the fourth placement example of the O-rings 31, 32 illustrated in FIG. 5, the sealing surface 2a of the front housing 2A and the sealing surface 2b of the rear housing 2B are formed into a cylindrical surface shape around a longitudinal axis of the housing 2 similar to FIG. 3. For example, the inner side O-ring groove 33 is formed on the sealing surface 2b, the outer side O-ring groove (step portion) 34 is formed on the sealing surface 2a, and the O-rings 31, 32 are respectively fitted therein.

In any of the first to fourth O-ring placement examples illustrated in FIG. 2 to FIG. 5, the filling ratio of the O-ring 32 in the O-ring groove 34 positioned on an outer side of the housing 2 is set to be greater than the filling ratio of the O-ring 31 in the O-ring groove 33 positioned on an inner side of the housing 2. The filling ratio is a volume (cross-sectional area) ratio of the O-rings 31, 32 with regard to the internal volume (cross-sectional area) of the O-ring grooves 33, 34.

First Embodiment

Figure 6A:
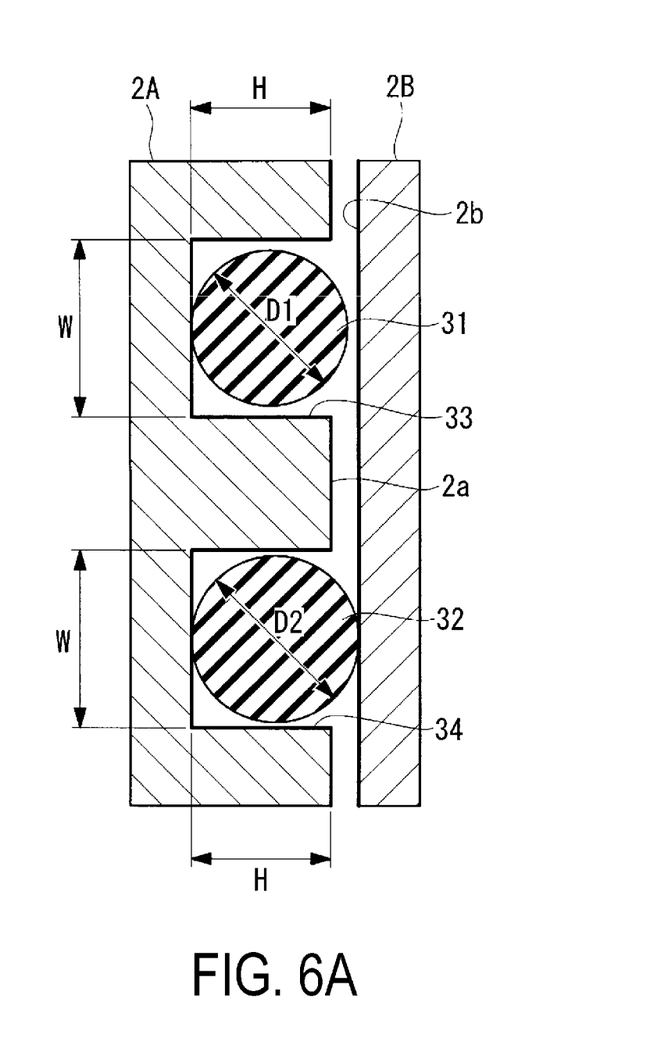
FIG. 6A is a vertical cross-sectional view before fastening, illustrating a first embodiment of the sealing structure according to the present invention.
Figure 6B:
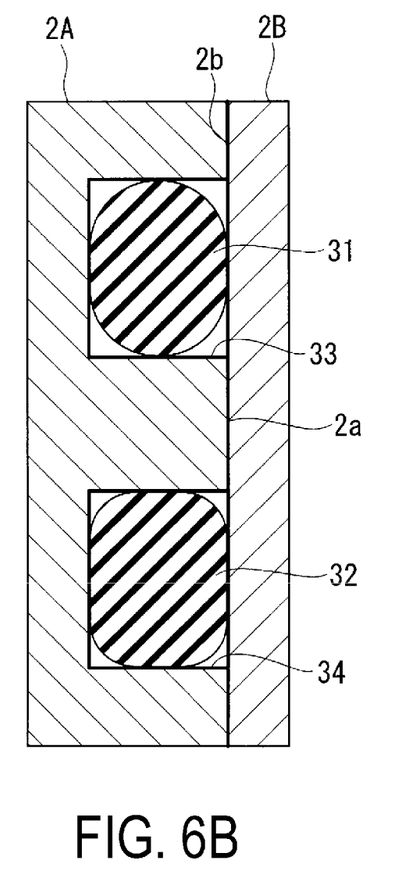
FIG. 6B is a vertical cross-sectional view after fastening, illustrating the first embodiment of the sealing structure according to the present invention.

FIG. 6A and FIG. 6B are vertical cross-sectional views illustrating a first embodiment of the sealing structure according to the present invention, where FIG. 6A illustrates a condition before fastening the bolt 3 illustrated in FIG. 1, and FIG. 6B illustrates a condition after fastening the bolt 3.

As illustrated in FIG. 6A, a cross section of the inner side O-ring groove 33 and a cross section of the outer side O-ring groove 34 are formed with the same shape and dimensions. In other words, height H and width W of the O-ring groove 33 and height H and width W of the O-ring groove 34 are the same dimensions. Therefore, the internal volume of the O-ring grooves 33, 34 are the same.

On the other hand, for the wire diameter of the O-rings 31, 32, wire diameter D2 of the outer side O-ring 32 is wider than wire diameter D1 of the inner side O-ring 31.

Therefore, when the bolt 3 illustrated in FIG. 1 is fastened such that the front housing 2A (sealing surface 2a) and rear housing 2B closely contact as illustrated in FIG. 6B, the filling ratio of the outer side O-ring 32 is greater than the filling ratio of the inner side O-ring 31.

Specific dimension examples of the O-ring grooves 33, 34 can include a depth dimension H=2.4 mm and width dimension W=3.0 mm. Furthermore, examples can include the O-ring 31 wire diameter D1=2.6 mm and O-ring 32 wire diameter D2=2.9 mm. In a case where the aforementioned dimensions are set, the filling ratio of the inner side O-ring 31 is approximately 74%, and the filling ratio of the outer side O-ring 32 is approximately 92%.

For example, the filling ratio when the wire diameter D1 of the inner side O-ring 31 is set to 2.7 mm is approximately 80%, and the filling ratio when the wire diameter D1 of the outer side O-ring 32 is set to 3.0 mm is approximately 98%. The filling ratios change slightly based on the material of the O-rings 31, 32 and H,W dimensional ratios of the O-ring grooves 33, 34.

According to the sealing structure with the configuration described above, the filling ratio (compression ratio) of the outer side O-ring 32 is greater than the inner side O-ring 31, and therefore, the sealability of the outer side O-ring 32 is also higher than the sealability of the inner side O-ring 31. Thereby, corrosive components from the outside that were conventionally allowed to penetrate over a long period of time can be effectively inhibited by the outer side O-ring 32.

Furthermore, the sealing structure combines an O-ring groove and O-ring that were conventionally used, and therefore, favorable sealability can be demonstrated by a simple and low-cost structure without requiring change in component type, change in structure, or the like.

The filling ratio of the inner side O-ring 31 is set to a target range of 70 to 75% and a maximum permissible value of 90%, and the filling ratio of the outer side O-ring 32 is set to a target range of 80 to 85% and a maximum permissible value of 98%, and therefore, the filling ratio of the inner side O-ring 31 is the same as before, and the filling ratio of the outer side O-ring 32 is greater than the inner side O-ring 31.

In an airtight container where the inside has high pressure as with the housing 2 of the vehicle refrigerant compressor 1, stress due to internal refrigerant pressure of the housing 2 is also applied on the inner side O-ring 31 in addition to compression in accordance with filling into the O-ring groove 33. Therefore, when the filling ratio of the inner side O-ring 31 is greater than conventional, the durability of the inner side O-ring 31 may be impaired.

Therefore, the filling ratio of the outer side O-ring 32 where internal refrigerant pressure of the housing 2 is not directly applied is higher than the filling ratio of the inner side O-ring 31, and therefore, sealability can be improved without impairing the durability of the outer side O-ring 32 and inner side O-ring 31.

According to the configuration of the first embodiment, the inner side and outer side O-ring grooves 33, 34 have the same cross-sectional shape and dimensions, and the wire diameter D2 of the outer side O-ring 32 can be wider than the wire diameter D1 of the inner side O-ring 31 to make the filling ratio of the outer side O-ring 32 greater, as illustrated in FIG. 6A and FIG. 6B. Therefore, the filling ratio of the outer side O-ring 32 can be greater and favorable sealability can be achieved by a very simple and low-cost structure, by simply changing the wire diameter D2 of the outer side O-ring 32 without changing the O-ring grooves 33, 34.

Second Embodiment

Figure 7A:
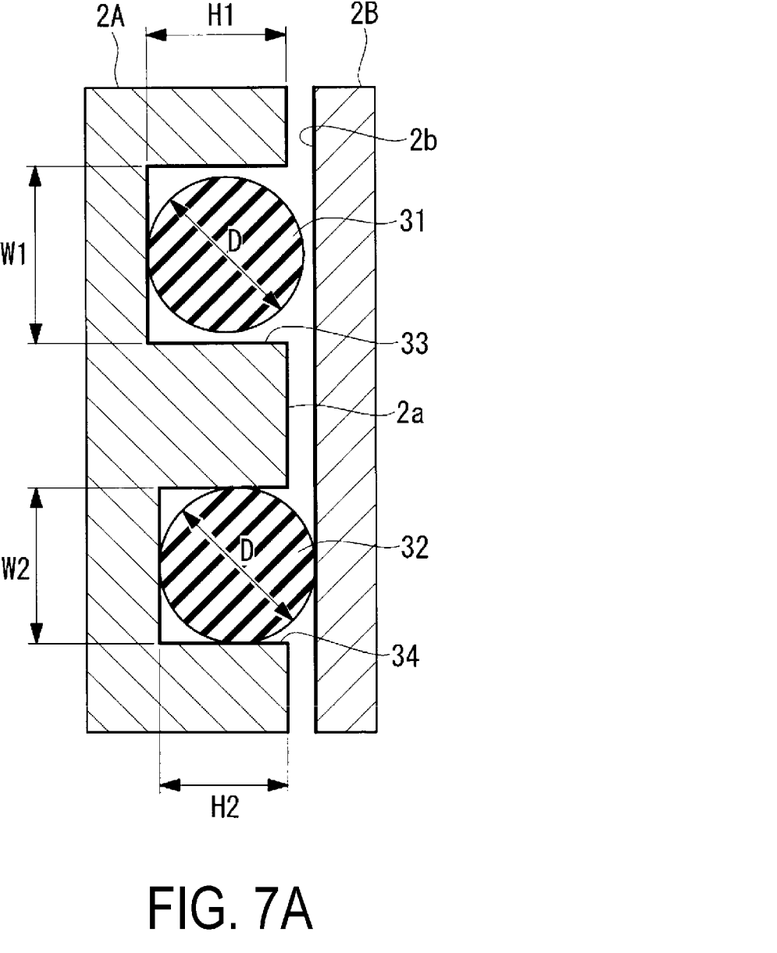
FIG. 7A is a vertical cross-sectional view before fastening, illustrating a second embodiment of the sealing structure according to the present invention.
Figure 7B:
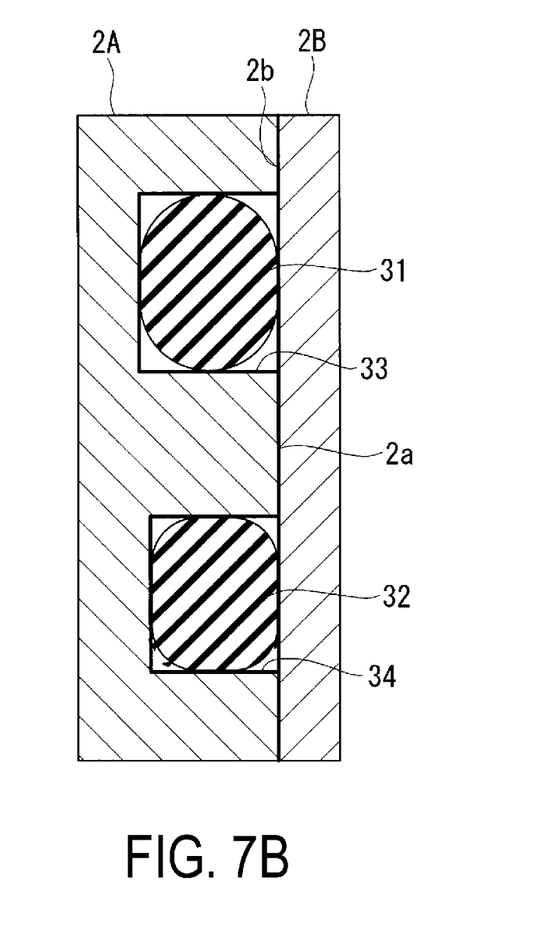
FIG. 7B is a vertical cross-sectional view after fastening, illustrating the second embodiment of the sealing structure according to the present invention.

FIG. 7A and FIG. 7B are vertical cross-sectional views illustrating a second embodiment of the sealing structure according to the present invention, where FIG. 7A illustrates a condition before fastening the bolt 3 illustrated in FIG. 2, and FIG. 7B illustrates a condition after fastening the bolt 3.

Herein, as illustrated in FIG. 7A, a wire diameter D of the inner side o-ring 31 and a wire diameter D of the outer side O-ring 32 are the same. On the other hand, the internal volume of the outer side O-ring groove 34 is smaller than the internal volume of the inner side O-ring groove 33, and thereby, the filling ratio of the outer side O-ring 32 is relatively greater than the filling ratio of the inner side O-ring 31.

A specific example can include a wire diameter D of the inside and outside O-rings 31, 32. Furthermore, examples can include a depth dimension H1=2.4 mm and width dimension W1=3.0 mm of the O-ring groove 33, and a depth dimension H2=2.2 mm and width dimension W2=2.6 mm of the O-ring groove 34. In a case where the aforementioned dimensions are set, the filling ratio of the inner side O-ring 31 is approximately 74%, and the filling ratio of the outer side O-ring 32 is approximately 93%. The filling ratios change slightly based on the material of the O-rings 31, 32 and H,W dimensional ratios of the O-ring grooves 33, 34.

According to the aforementioned configuration of the second embodiment, the filling ratio of the outer side O-ring 32 can be relatively larger than the filling ratio of the inner side O-ring 31 by making the internal volume of the outer side O-ring groove 34 smaller than the internal volume of the inner side O-ring 33, without changing the inner and outer O-rings 31, 32. Changing the shape of the O-ring, grooves 33, 34 can be easily performed by changing the setting of a cutting machine. Therefore, favorable scalability can be achieved by a very simple and inexpensive configuration.

The configuration of the second embodiment and the second placement example of the O-rings 31, 32 illustrated in FIG. 3 are combined such that the wire diameter and diameter of the inside and outside O-rings 31, 32 are both the same component. Therefore, a mistake of combining the inside and outside O-rings 31, 32 can be prevented in conjunction with contributing to cost reduction by reducing the O-ring types.

As described above, according to sealing structure of the housing 2 and the vehicle refrigerant compressor 1 provided with the structure according to the aforementioned embodiments, favorable sealability can be achieved by a simple and low-cost structure using the O-rings 31, 32, corrosive components from the outside conventionally allowed to penetrate over a long period of time can be effectively inhibited by the outer side O-ring 32, and durability of the vehicle refrigerant compressor 1 can be significantly enhanced.

The present invention is not limited only to the configuration of the aforementioned embodiment, and changes and modifications may be made as appropriate. Embodiments having such changes and modifications are included in the scope of claims of the present invention.

For example, in the aforementioned embodiments, an example was described where the present invention was applied in a configuration of the O-rings 31, 32 and O-ring grooves 33, 34 on the sealing surfaces 2a, 2b between the front housing 2A and rear housing 2B configuring the housing 2 of the vehicle refrigerant compressor 1, but the present invention can also be applied in other type of airtight container.

Furthermore, the number or position of the O-rings 31, 32 may be changed, or the material or hardness of the O-ring 31 or O-ring 32 may be different. In a case where the hardness of the O-rings is different, the material that is harder and more difficult to compress can be applied in the outer side O-ring 32. Thereby, the pressure where the outer side O-ring 32 is press contacted into the O-ring groove 34 and front housing 2B may be higher than the inner side O-ring 31, and thus the sealability can be improved.

In a case where the material of the O-ring 31 and O-ring 32 are different, the material of the outer side O-ring 32 can be HNBR, and the material of the inner side O-ring 31 can be EPDM. Using the HNBR as the outer material can ensure the soundness of rubber even in a case where engine oil or other mineral oil drips outside the compressor. Using EPDM as the material of the inner side O-ring 31 can achieve more favorable refrigerant sealability at extremely low temperatures as compared to HNBR.

Furthermore, the cross-sectional shape of the O-ring grooves 33, 34 is not limited to a channel groove shape used in the aforementioned embodiments, and may be another cross-sectional shape groove such as a V groove, U groove, or the like. The cross-sectional shape of the O-rings 31, 32 is also not limited to a round shape and can be changes to a square shape or the like.

REFERENCE SIGNS LIST

1 Vehicle refrigerant compressor
2 Housing (container)
2A Front housing (first container structural member)
2B Rear housing (second container structural member)
2a Sealing surface (first sealing surface)
2b Sealing surface (second sealing surface)
31 Inner side O-ring
32 Outer side O-ring
33 Inner side O-ring groove
34 Outer side O-ring groove

The invention claimed is:

1. A sealing structure for an airtight container, comprising:
a first sealing surface formed in an annular shape on a first container structural member configuring a container;
a second sealing surface overlaid on the first sealing surface, formed in annular shape on a second container structural member configuring the container;
a plurality of concentric O-ring grooves formed on at least one of the first sealing surface and second sealing surface; and
a plurality of O-rings fitted into the plurality of O-ring grooves; wherein
the filling ratio of the O-ring in the O-ring groove positioned on an outer side of the container is preset to be greater than the filling ratio of the O-ring in the O-ring groove positioned on an inner side of the container to which stress due to internal pressure of the container is applied.

2. The sealing structure for an airtight container according to claim 1, wherein
the filling ratio of the O-ring in the O-ring groove positioned on an inner side of the container is set to a target range of 70 to 75% and a maximum permissible value of 90%, and
the filling ratio of the O-ring in the O-ring groove positioned on an outer side of the container is set to a target range of 80 to 85% and a maximum permissible value of 98%.

3. The sealing structure for an airtight container according to claim 1, wherein
the cross section of the O-ring groove positioned on an inner side of the container and the cross section of the O-ring groove positioned on an outer side of the container have the same shape and dimensions, and
a wire diameter of the O-ring positioned on an outer side of the container is wider than a wire diameter of the O-ring positioned on an inner side of the container such that the filling ratio of the O-ring positioned on an outer side is greater than the filling ratio of the O-ring positioned on an inner side.

4. The sealing structure for airtight container according to claim 1, wherein
the wire diameter of the O-ring positioned on an inner side of the container and the wire diameter of the O-ring positioned on an outer side of the container are the same, and
an internal volume of the O-ring groove positioned on an outer side of the container is smaller than an internal volume of the O-ring groove positioned on an inner side of the container such that the filling ratio of the O-ring positioned on an outer side is greater than the filling ratio of the O-ring positioned on an inner side.

5. A vehicle refrigerant compressor, comprising the sealing structure for an airtight container according to claim 1.

* * * * *